US009080876B2

(12) United States Patent
Denicola

(10) Patent No.: US 9,080,876 B2
(45) Date of Patent: Jul. 14, 2015

(54) INTERMEDIATE RENDEZVOUS LOCATION IDENTIFIER APPLICATION

(76) Inventor: Derrick Denicola, North Hollywood, CA (US)

( * ) Notice: Subject to any disclaimer, the term of this patent is extended or adjusted under 35 U.S.C. 154(b) by 0 days.

(21) Appl. No.: 13/532,053

(22) Filed: Jun. 25, 2012

(65) Prior Publication Data

US 2013/0345964 A1 Dec. 26, 2013

(51) Int. Cl.
  *G06Q 30/02* (2012.01)
  *G01C 21/20* (2006.01)
  *G01C 21/34* (2006.01)
(52) U.S. Cl.
  CPC ............ *G01C 21/20* (2013.01); *G01C 21/3438* (2013.01)
(58) Field of Classification Search
  CPC ..... H04L 12/5865; H04L 51/20; H04L 67/18; H04W 8/18; G06Q 10/06311; G06Q 10/109; G06Q 10/1095; G06Q 30/02; G06Q 10/10; G01C 21/3407; G01C 21/3484; G01C 21/20; G01C 21/3697; G01C 21/3617; G08G 1/0104; G08G 1/052; G07C 1/10; G01S 5/0018; G01S 5/0252
  USPC .................. 701/422, 32.2, 32, 465; 705/7.19; 455/456.3, 456.5; 340/905, 573.4; 715/751; 709/206
  See application file for complete search history.

(56) References Cited

U.S. PATENT DOCUMENTS

| | | | | |
|---|---|---|---|---|
| 8,082,096 | B2 * | 12/2011 | Dupray | 701/465 |
| 8,276,081 | B2 * | 9/2012 | Boyd | 715/751 |
| 2004/0140909 | A1 * | 7/2004 | Meadows et al. | 340/905 |
| 2007/0282661 | A1 * | 12/2007 | Franco | 705/9 |
| 2008/0171559 | A1 * | 7/2008 | Frank et al. | 455/456.5 |
| 2009/0170531 | A1 * | 7/2009 | Hampel et al. | 455/456.3 |
| 2010/0274855 | A1 * | 10/2010 | Wassingbo | 709/206 |
| 2012/0136529 | A1 * | 5/2012 | Curtis et al. | 701/32.2 |
| 2012/0150580 | A1 * | 6/2012 | Norton | 705/7.19 |
| 2012/0161971 | A1 * | 6/2012 | Nasir et al. | 340/573.4 |

* cited by examiner

*Primary Examiner* — Tuan C. To
*Assistant Examiner* — Yuri Kan
(74) *Attorney, Agent, or Firm* — James A. Italia; Italia IP

(57) ABSTRACT

A system for determining a suitable geographic rendezvous location for a plurality of geographically separated participants, preferably realized as a computer application which may be entered into devices such as Smartphones. The system inputs initial locations of the participants, determines a location which is intermediate the participants, and communicates the determined location to the participants. Optionally, the system may generate graphic displays on screens of the Smartphones, showing identification of the determined location, travel directions such as maps, warnings of impediments to travel, and supplementary information pertaining to the determined location such as addresses and contact data. The system may accept conditions influencing determination of a suitable location, may offer a choice of determined locations, and may draw on internet based sources for background information necessary for determining the determined location and for generating the displays. Some processing may be sourced remotely rather than within a participating Smartphone.

10 Claims, 2 Drawing Sheets

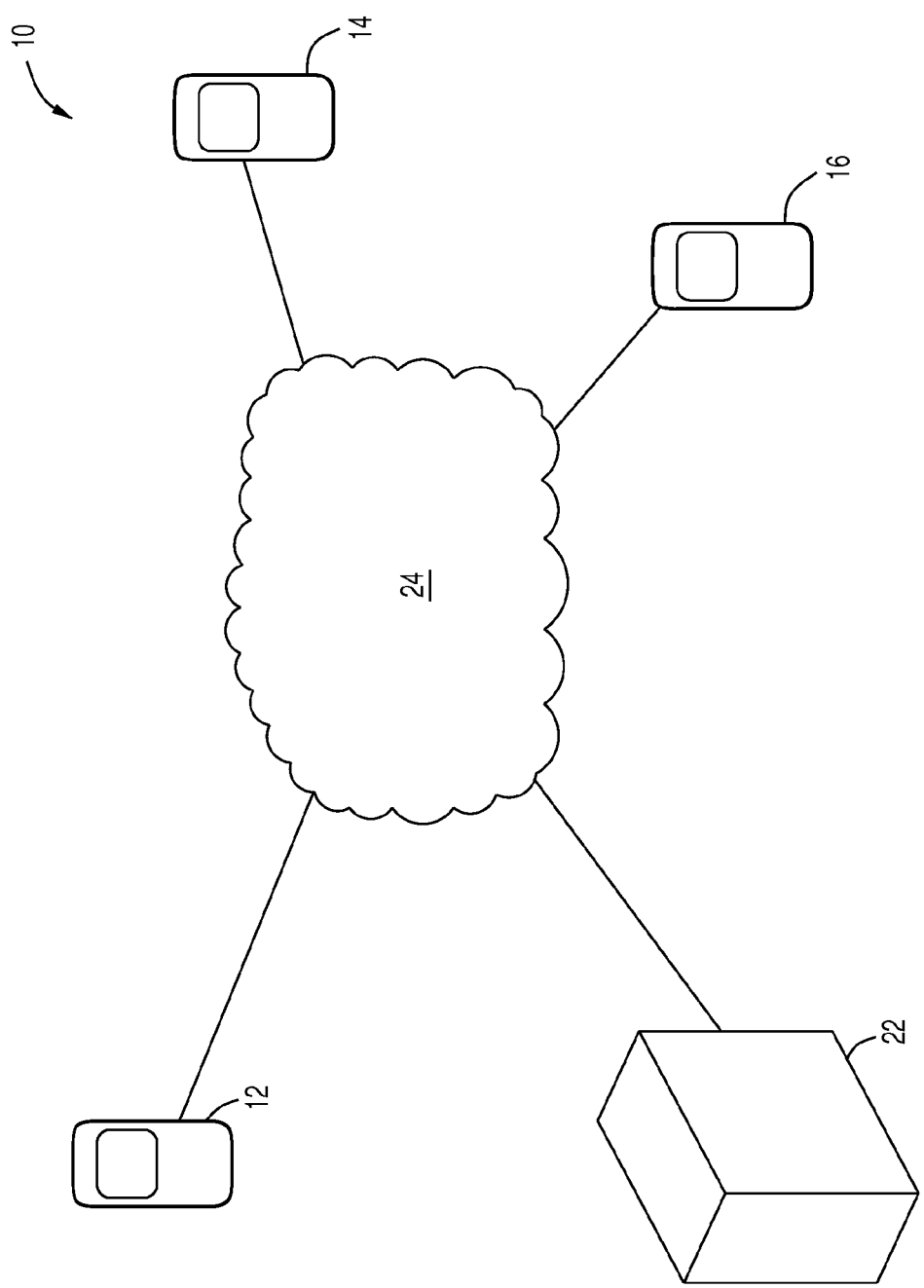

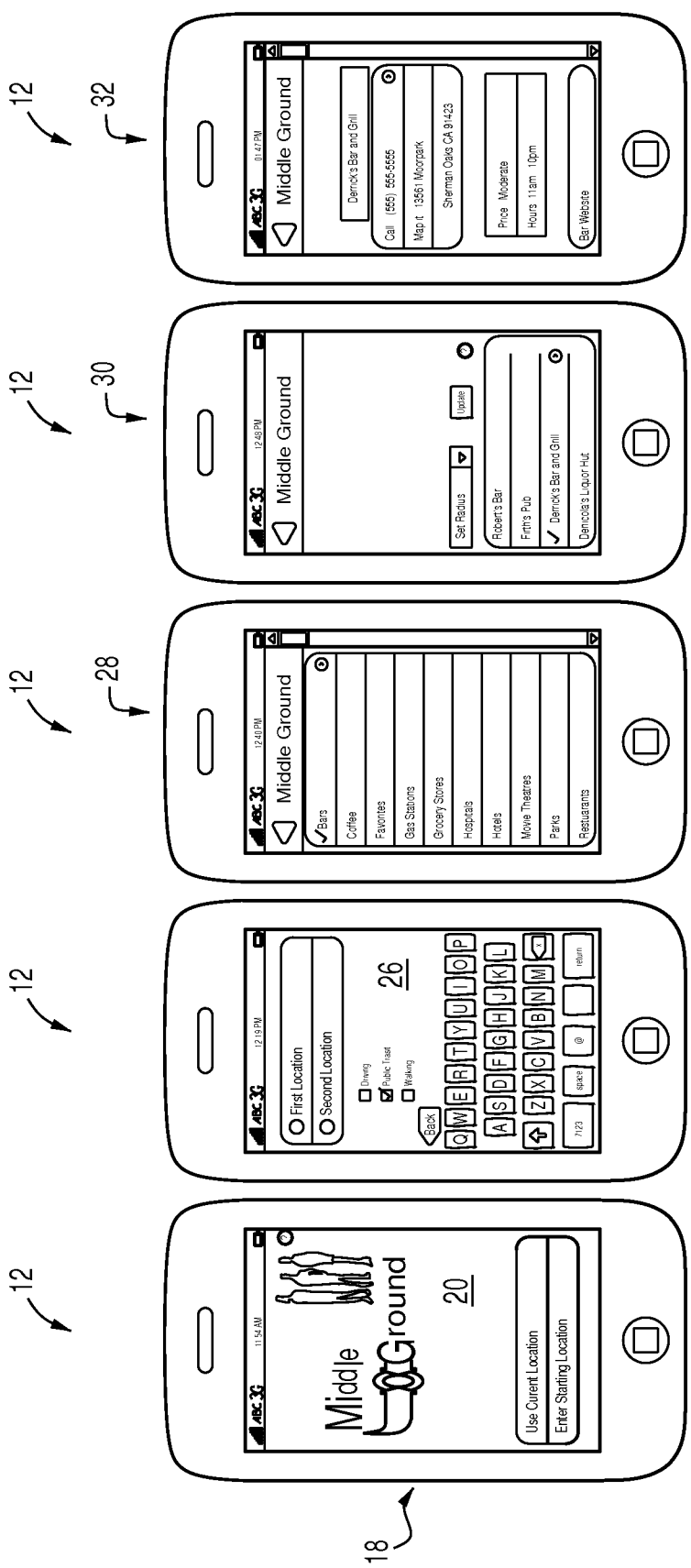

US 9,080,876 B2

INTERMEDIATE RENDEZVOUS LOCATION IDENTIFIER APPLICATION

FIELD OF THE INVENTION

The present invention relates to navigation, and more particularly, to a computer implementable and wirelessly communicable protocol applicable to a Smartphone or the like for identifying an intermediate geographic point located between two or among more than two geographically separated parties.

BACKGROUND OF THE INVENTION

There may arise the occasion that two or more parties who are geographically separated want to make arrangements to meet face to face. A suitable rendezvous destination may be arbitrarily picked or agreed on. However, the participating parties may be unfamiliar with the locale or otherwise unable to identify a suitable meeting place on their own. The problem may be purely geographic, such as not being aware of a suitable location, or may be that the parties may not know the details of a geographically intermediate location, even if they can identify such a theoretical intermediate location. For example, the arbitrarily chosen location may not have desired amenities such as food entertainment, internet access, access to desired commercial products and services, or may be unduly expensive, may be located in an objectionably crowded area, may be in an unsafe neighborhood, may entail objectionable conditions such as noise, or may otherwise be unsuitable for the intended rendezvous.

There exists a need for a portable, practical automated system for identifying a suitable rendezvous point for geographically separated parties.

SUMMARY OF THE INVENTION

The present invention addresses the above stated need by providing an application for a processing enabled mobile communications device such as a Smartphone. The application is provided with inputs of two or more locations for respective parties, processes this data to determine a suitable geographically intermediate rendezvous location, and communicates the identified rendezvous location to the participants.

Initial location inputs may be manual or automated. Certain conditions may be imposed into the decision process, such as specifying that the selected location will be equidistant from the initial locations by distance or by time, or will be restricted to a selected category of venues, such as restaurants, hotels, parks, or other possibilities. Processing may be conducted in part or entirely at a remote location. One or more proposed solutions, or rendezvous locations identified as meeting selected criteria may then be communicated to the Smartphones in the possession of the various participants who intend to rendezvous.

It is an object of the invention to facilitate an automated selection process for identifying a suitable rendezvous point for at least two geographically separated parties.

Another object of the invention is that an identified suitable rendezvous point be communicated to the participants by wireless communication.

A further object of the invention is that the automated selection process be accessible and operable through a portable communications device.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a diagrammatic representation of apparatus which may be employed in utilizing the present invention.

FIG. 2 is a plan view of one of a plurality of mobile communications devices shown in FIG. 1, showing first displayed content displayed on the screen of the mobile communications device.

FIG. 3 is similar to FIG. 2, but shows subsequent displayed content displayed on the screen.

FIG. 4 is similar to FIG. 2, but shows still subsequent displayed content displayed on the screen.

FIG. 5 is similar to FIG. 2, but shows further subsequent displayed content displayed on the screen.

FIG. 6 is similar to FIG. 2, but shows still further subsequent displayed content displayed on the screen.

DETAILED DESCRIPTION

Referring first to FIG. 1, according to at least one aspect of the invention, there is shown apparatus of a system 10 for determining a suitable geographic rendezvous point for a plurality of geographically separated participants and communicating a determined rendezvous point to the participants. The participants are represented by respective mobile, wireless, data processing capable communications devices such as Smartphones 12, 14, and 16. At least one of the Smartphones 12, 14, 16 is provided with a computer executable or implementable program or application which is functional to implement data processing steps for receiving inputs identifying initial geographically separated locations for each one of the participants, to implement data processing steps for determining an intermediate geographic location which is intermediate relative to the initial geographic locations of the participants, and is capable of generating wireless data signals disposed to communicate the determined intermediate geographic location to the other Smartphones 12, 14, or 16. For semantic purposes of describing the invention, it will be assumed that the Smartphone 12 has a computer application according to the present invention loaded thereinto.

Turning now to FIG. 2, the Smartphone 12 may comprise a display screen 18. An exemplary opening screen 20 may identify the computer application by for example a service mark, logo, text, or in other ways, and may display a prompt to enter an input indicating the current geographic location of the Smartphone 12. As employed herein, "display screen 18" will refer to the apparatus of the Smartphone 12, 14, or 16 under discussion, whereas all other mentions of "screen" will refer to displayed content, and not to the physical screen 18 itself. It will be seen that two selectable windows are displayed in the opening screen 20. These windows relate to an input of the current geographic location. The window bearing the legend "use current location", if invoked, may cause the Smartphone 12 to rely on internal capability such as GPS, aGPS, and the like, to enter the location into the data processing portions of the system 10.

It may be mentioned here that processing capability may be contained entirely or in part within one or more Smartphones such as the Smartphone 12, or may be contained entirely or in part within a remote processor such as a server 22 (see FIG. 1) which is in wireless communication with the Smartphone 12. Wireless communication may imply use of the internet 24, cellular telephone networks (not shown), other wireless communications channels (not shown), or any combination of these.

As an alternative to using internal location information, the location information input to the Smartphone 12 may be entered manually, such as by entering an address on real or virtual keys of a keypad, such as that depicted in a subsequent screen 26 (see FIG. 3), in response to the legend "enter starting location". It would be possible to enter initial or current locations of all participants (i.e., the Smartphones 12, 14, and 16) from one Smartphone such as the Smartphone 12 by manual entry for example. Entry of location information for other participating Smartphones such as the Smartphones 14 and 16 may be regarded as remote implementation of entry or inputting of initial location data. Alternatively, such as when all of the Smartphones 12, 14, 16 are provided with an application predicated on the present invention, initial location data could be entered at each participating Smartphone 12, 14, 16. Of course, the system 10 could be fashioned to accommodate a combination of different initial location input types.

If desired, a command could then be entered to cause the system 10 to identify a suitable intermediate location as a rendezvous location which may subsequently be communicated to each Smartphone 12, 14, or 16.

However, the system 10 may accommodate computer implementable data processing steps for imposing constraints on selecting the determined intermediate geographic location. In most cases, constraints may be based on at least one personal preference of at least one of the participants (i.e., the operators of the Smartphones 12, 14, 16), although it would be possible for constraints to originate elsewhere. One possible constraint illustrated in FIG. 3 is implementing one of a plurality of modes of travel. In the illustrated example, the choice offered by the system includes driving, taking public transportation, and walking.

Of course, more than one constraint may be imposed. For example, even though the system 10 may be limited to selections appropriate for the selected mode of travel, there may also be imposed a constraint limiting potential determined intermediate geographic locations to those which are separated from the initial geographically separated locations of the participants by equal distances. In other examples, the constraint, which may be explicitly selected by the user or which may arise internally within the processing portion of the system 10 may be that requiring that distances such as driving distances be based on use of public roads.

It may be mentioned here that "user" and "participant" both describe people using the system 10 and who are part of a group of at least two related parties attempting to rendezvous with one another, and that these terms will be used interchangeably herein.

It would also be possible to impose a constraint of limiting potential determined intermediate geographic locations to those which are separated from the initial geographically separated locations of the participants by equal travel times regardless of geographic travel distances.

Referring now to FIG. 4, which shows a still subsequent screen 28, the constraint may comprise limiting potential determined intermediate geographic locations to those of a selected category of destination types. In the example of FIG. 4, the selectable destination types include bars, coffee shops, previously established personal favorite places, gas stations, specific retail stores, shopping centers, and shopping malls, hospitals, hotels, movie theaters, parks, and restaurants.

Among the constraints which may be imposed into the process of selecting candidate intermediate geographic locations, understanding that more than one constraint may be imposed or entered into any specific usage of the system 10, is limiting potential determined intermediate geographic locations to those to which travel avoids identifiable travel delays. Identification of travel delays may be obtained from publicly available sources, and may comprise the further step of wirelessly querying publicly available information sources which routinely identify to the public candidates meeting the specified criteria. This function may be automated in that should the user or users specify that delays should be avoided, such as by responding to a prompt (not shown) which could be displayed on the display screen 18, the system 10 will implement a query without further intervention by the user or users.

The system 10 may as part of presenting a proposed intermediate geographic location to one or more users of the system 10 may include data operable to implement a suggested route display on a mobile communications device having a display screen showing a suggested travel route to the determined intermediate geographic location or otherwise communicate travel directions to the user or users. Travel directions may take any known form, such as textual step by step directions, such as are currently known in GPS based guides, or may include displaying a map on the display screens of Smartphones such as the Smartphones 12, 14, 16. This is illustrated in FIG. 5, wherein it is seen that a list of plural possible candidate intermediate geographic locations is presented, with one specific recommendation being visually flagged. Recommended routes to that recommended candidate intermediate geographic location may be flagged by highlighting for example, or in other ways. Map presentations may be supplemented by textual or audible instructions.

The terms "proposed intermediate geographic locations" and "candidate intermediate geographic locations" will be used interchangeably herein.

Where presented as part of a recommendation, the travel directions may include warnings of high traffic density or slow conditions along the intended route, emergency situations along the intended route, construction activity delays along the intended route, closures of normally available roads along the intended route, and one way restrictions of roads impinging upon the intended route. This presentation may include a prompt (not shown) giving the user or users of the system 10 the option of initiating presentation of an alternate route or even an alternate destination.

The latter may be performed all in one step, or alternatively stated, presenting proposed candidate intermediate geographic locations simultaneously, such as by listing a plurality of candidate intermediate geographic locations as depicted on the screen 30 shown in FIG. 5. The plurality of candidate intermediate geographic locations will of course comply with previously imposed constraints.

It would also be possible to arrange plural candidate intermediate geographic locations to be presented in successive steps, or alternatively stated, first presenting one or more candidate intermediate geographic locations, and offering the user or users an opportunity to expand this initial selection. Expanding the initial selection may be implementing for example by providing a user or participant with control access to the system 10 operable to enable the participant to modify a previously entered constraint so as to expand the number of potential candidate determined intermediate geographic locations. For example, the modification may comprise expanding the geographic location of potential candidate locations to an increased specified distance or radius from a determined intermediate geographic location which has been proposed by the system 10.

The option may be implemented for example by responding to a displayed prompt (not shown) which annunciates a message such as "show more options?" or "widen radius of chosen location?". Thus the system 10 may present more than one intermediate geographic location in one step or in successive steps.

Once one or more candidate intermediate geographic locations are communicated to users of the system 10, the wireless data signals disposed to communicate the determined intermediate geographic location to mobile communications devices may include data in addition to mere identification data pertaining to the determined intermediate geographic location, where the identification data may include the name of a business establishment for example, and the additional data may include at least one of the group including address, telephone number, website, hours of operation, and estimate of relative costliness of commercial offerings of the determined intermediate geographic location. These options are shown on the screen 32 in FIG. 6.

The system 10 may have the capability of being compatible with mobile communications devices other than Smartphones provided with screens, such as the Smartphone 12. The system may be adapted to generate wireless data signals disposed to communicate the determined intermediate geographic location to mobile communications devices rendered in one of any known communications protocol usable by commercially available mobile communications devices. Also, where there are more than two receiving participants each of whom must be advised of candidate intermediate geographic destinations, the several communications may be made to receiving participants may be made in different known communications protocols. For example, whereas users having mobile phones lacking display screens may be reached by SMS (short message service), email, or by any other known or yet-to-be-developed protocol which comes into commercial availability.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A computer-implemented method of communicating a suitable geographic rendezvous point to a plurality of geographically separated participants, by a wireless communications data processing device, which is configured with a display screen, and further configured to implement data processing steps for receiving inputs identifying initial geographically separated locations for each one of said participants by a server, comprising:
   identifying initial geographically separated locations for each one of the participants utilizing said wireless communications data processing device;
   determining an intermediate geographic location which is intermediate relative to the initial geographic locations of the participants utilizing said wireless communications data processing device;
   imposing constraints by said wireless communications data processing device to select the determined intermediate geographic location based on at least one personal preference of at least one of the participants, wherein said constraints implement a plurality of modes of travel;
   wherein the constraint comprises limiting potential determined intermediate geographic locations to those which are separated from the initial geographically separated locations of the participants by equal travel time; and
   wherein the constraint comprises limiting potential determined intermediate geographic locations to those which are separated from the initial geographically separated locations of the participants by equal travel time regardless of geographic travel distances;
   communicating the determined intermediate geographic location to said wireless communications data processing devices; and
   displaying the determined intermediate geographic location to said wireless communications data processing devices via said display screen.

2. The computer-implemented method of claim 1, wherein imposing constraints on selecting the determined intermediate geographic location further comprises limiting potential determined intermediate geographic locations to those to which travel avoids identifiable travel delays.

3. The computer-implemented method of claim 1, wherein determining an intermediate geographic location which is intermediate relative to the initial geographic locations of the participants further comprises wirelessly querying publicly available information sources which routinely identify to the public intermediate location candidates meeting the specified criteria, and selecting the intermediate geographic location based results of querying the publicly available information sources.

4. The computer-implemented method of claim 1, wherein communicating the determined intermediate geographic location to wireless communications data processing devices further comprises communicating travel directions to the determined intermediate geographic location.

5. The computer-implemented method of claim 4, wherein communicating travel directions further comprises including warnings of high traffic density or slow conditions along the intended route, emergency situations along the intended route, construction activity delays along the intended route, closures of normally available roads along the intended route, and one way restrictions of roads impinging upon the intended route.

6. The computer-implemented method of claim 4, wherein communicating travel directions further comprises proposing at least one of a plurality modes of travel which are offered by the system method, including driving, public transportation, and walking.

7. The computer-implemented method of claim 1, wherein determining an intermediate geographic location further comprises determining a plurality of intermediate geographic locations and presenting the plurality of intermediate geographic locations simultaneously.

8. The computer-implemented method of claim 1, wherein communicating the determined intermediate geographic location further comprises communicating at least one of the group including address, telephone number, website, hours of operation, and estimate of relative costliness of commercial offerings of the determined intermediate geographic location.

9. The computer-implemented method of claim 1, further comprising enabling a participant having control access to the system method to modify previously entered constraints so as to expand the number of potential candidate determined intermediate geographic locations.

10. The computer-implemented method of claim 1, wherein the plurality of modes of travel is selected from a group consisting of:
- walking,
- driving, and
- taking public transportation.

\* \* \* \* \*